(12) United States Patent
Obara (10) Patent No.: US 8,355,192 B2
(45) Date of Patent: Jan. 15, 2013

(54) OPTICAL SCANNING APPARATUS

(75) Inventor: Mitsuhiro Obara, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 286 days.

(21) Appl. No.: 12/511,880

(22) Filed: Jul. 29, 2009

(65) Prior Publication Data

US 2010/0033790 A1 Feb. 11, 2010

(30) Foreign Application Priority Data

Aug. 8, 2008 (JP) .................................. 2008-205634

(51) Int. Cl.
*G02B 26/08* (2006.01)
(52) U.S. Cl. .................................................... 359/204.1
(58) Field of Classification Search .... 359/196.1–226.3; 347/243, 259–260
See application file for complete search history.

(56) References Cited

U.S. PATENT DOCUMENTS

| 4,623,242 | A | * | 11/1986 | Hayashi et al. | 358/300 |
| 6,842,274 | B2 | * | 1/2005 | Akatsu et al. | 359/204.1 |
| 7,508,859 | B2 | | 3/2009 | Azami et al. | 372/101 |
| 2004/0174427 | A1 | | 9/2004 | Iwamoto | 347/244 |
| 2006/0232844 | A1 | * | 10/2006 | Nakajima | 359/204 |

FOREIGN PATENT DOCUMENTS

| CN | 1527155 | 9/2004 |
| JP | 11-242176 | 9/1999 |
| JP | 2000-193902 | 7/2000 |
| JP | 2000193902 | 7/2000 |

OTHER PUBLICATIONS

Office Action dated May 24, 2011 in counterpart Chinese Application No. 200910161130.2, and English language translation thereof.

* cited by examiner

*Primary Examiner* — Jennifer L. Doak
(74) *Attorney, Agent, or Firm* — Fitzpatrick, Cella, Harper & Scinto (57) ABSTRACT

The optical scanning apparatus including a light source unit having plurality laser light sources for emitting laser light and one lens in which the laser light emitted from the plurality laser light sources is transmitted, a deflect device that deflects and scans the laser light on an image bearing member, an optical member that images the laser light on the image bearing member, a housing that internally includes the deflect device and the optical member, the housing forms an opening portion that passes through the laser light emitted from the plurality of the laser light sources, and an elastic member that blocks a gap between the lens and the opening portion, the elastic member being pinched between the lens and the housing. It achieves sealing of the flow-in path and sealing of the gap between the light source unit and the housing with a simple configuration.

9 Claims, 12 Drawing Sheets

OPTICAL SCANNING APPARATUS

BACKGROUND OF THE INVENTION

1. Field of the Invention

The present invention relates to an optical scanning apparatus mounted on an image forming apparatus such as a laser beam printer or a digital copier including an electrophotographic process means.

2. Description of the Related Art

In recent years, improvement in dust proof performance of the optical scanning apparatus is desired in accordance with increase in speed of the laser beam printer and diversification of the use environment.

Figure 14:
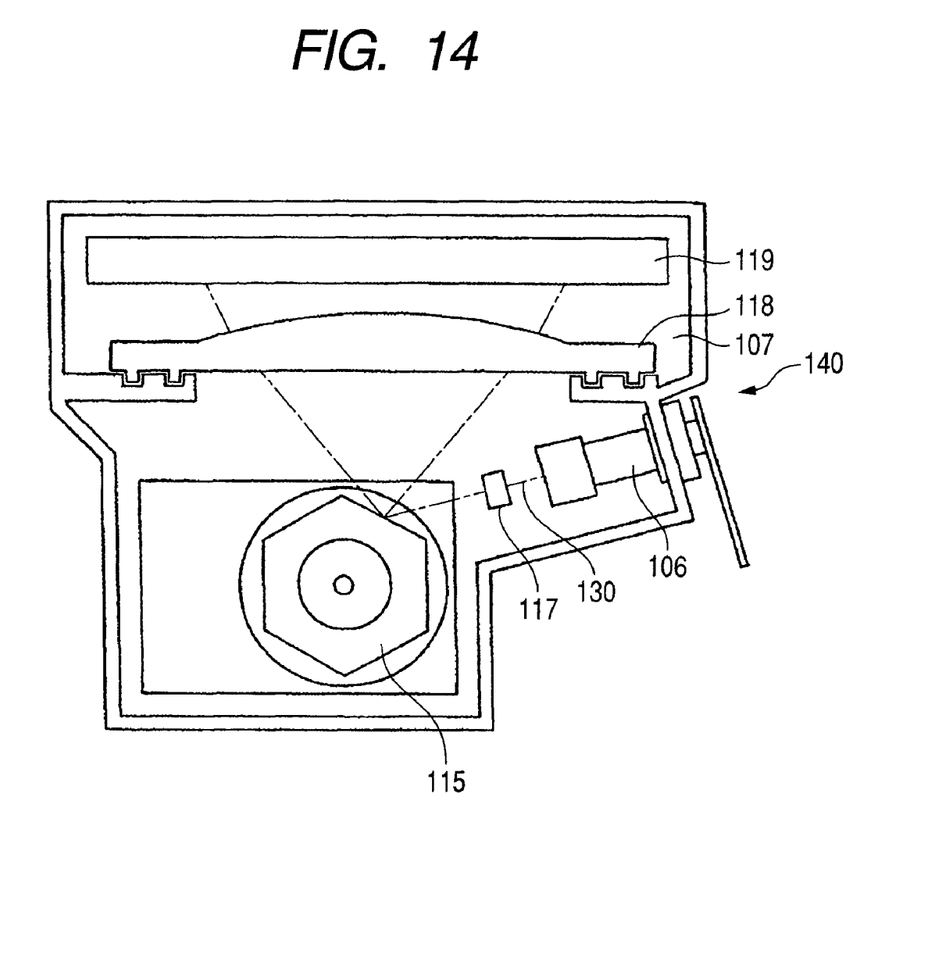
FIG. 14 is an explanatory view of a conventional optical scanning apparatus.
Figure 15:
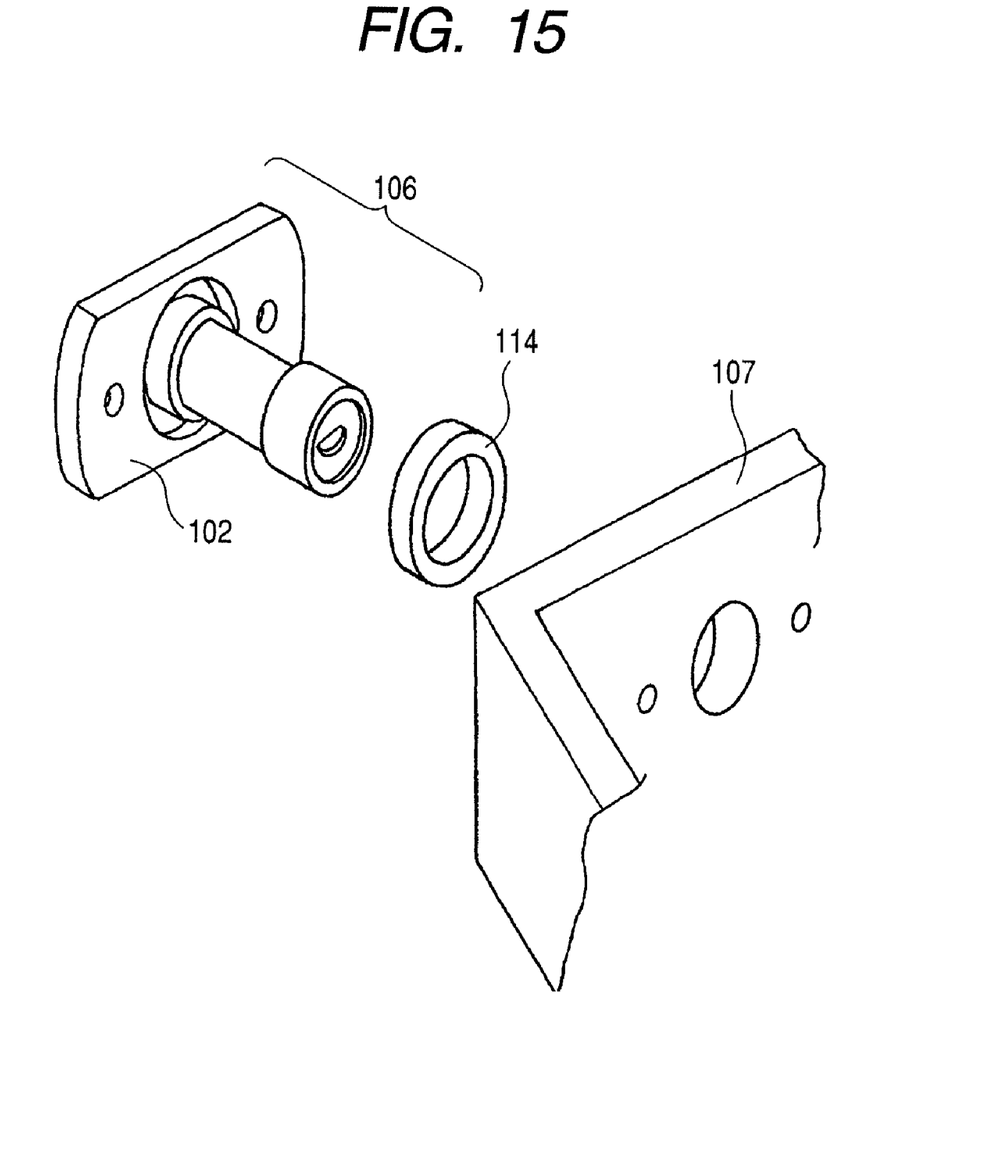
FIG. 15 is an explanatory view of a conventional light source device.

As a conventional embodiment, an optical scanning apparatus described in Japanese Patent Application Laid-Open No. H11-242176 is illustrated in FIGS. 14 and 15.

As illustrated in FIG. 14, an optical scanning apparatus 140 emits laser light 130 from a fitted and assembled light source device (light source unit) 106. The laser light 130 emitted from the light source device 106 passes through a cylindrical lens 117 and provides a linear image on a reflection surface of a polygon mirror 115. The laser light 130 is deflected by rotating the polygon mirror 115, and is imaged and scanned on a surface to be scanned (e.g., photosensitive drum) (not shown) through a scanning lens 118 and a folding mirror 119, thereby forming an electrostatic latent image.

The light source device 106 emits the laser light 130 from a laser light source (not shown) serving as a light source, and the laser light 130 is converted to a parallel light flux by a collimator lens (not shown). As illustrated in FIG. 15, the laser light source is fixed to a laser holder 102 by using a known technology such as press-fit, and the collimator lens is fixed after being position adjusted with respect to the laser holder 102. The focus and optical axis adjustment of the laser light source and the collimator lens is thereby carried out.

When the polygon mirror 115 is rotated, the surrounding air is also stirred, and the air enters and exits an optical box (housing) 107. At the same time, dust at the periphery of the optical box 107 is also taken in, and such dust adheres to the polygon mirror 115, the scanning lens 118, and the folding mirror 119. The degree of adhesion is accelerated by the number of revolutions of the polygon mirror 115 and the extent of pollution of the air of the use environment. As a result, there may arise a problem that unevenness of light intensity is caused.

The main flow-in path of the dust from the vicinity of the laser light source is the gap between the light source device 106 and the optical box 107. In Japanese Patent Application Laid-Open No. H11-242176, an elastic member 114 is sandwiched between the fitted light source device 106 and the optical box 107 to prevent the dust from flowing into the interior of the optical box 107 from the flow-in path.

However, the following problems and restrictions still exist in the conventional technology described above.

In Japanese Patent Application Laid-Open No. H11-242176, the flow-in path that passes through the light source device itself barely exists, and the desired dust proof performance is achieved by simply sandwiching the elastic member between the light source device and the optical box.

However, such achievement is realized by adopting a system including a laser light source of a simple system, the system being configured such that the laser light source is press-fit to the laser holder, in Japanese Patent Application Laid-Open No. H11-242176. In other words, the press-fit region of the laser light source is in a substantially sealed state. Further, although the collimator lens is bonded at a minimum extent of only three points on the periphery and there is a gap region without adhesive on the periphery, a problem does not arise because this kind of the gap has an extremely small area.

Consideration of bonding the entire periphery of the collimator lens to enhance sealability is known. Such consideration can be made in the case where the collimator lens is sufficiently small, but is restricted if the collimator lens is a large lens such as a compound collimator lens in which collimator lenses of multiple systems are integrated.

When adopting the compound collimator lens, the laser light source side needs to be adjusted and bonded for adjusting the positions of the collimator lens of each system and the laser light source.

Therefore, in the configuration adopting the compound collimator lens, the flow-in path of dust that passes through the light source device itself exists, and improvement is desired from the standpoint of dust proof performance.

SUMMARY OF THE INVENTION

The present invention has been made in view of the above. An object of the present invention is therefore to provide an optical scanning apparatus for sealing the flow-in path that passes through the light source unit itself and sealing the gap between the light source unit and the housing with a simple configuration in a configuration using a compound incoming lens.

Another object of the present invention is to provide an n optical scanning apparatus including a light source unit including a plurality of laser light sources for emitting laser light and one lens in which the laser light emitted from the plurality of the laser light sources is transmitted, the one lens being provided with respect to the plurality of the laser light sources, a deflect device that deflects and scans the laser light on an image bearing member, an optical member that images the laser light on the image bearing member, a housing that internally includes the deflect device and the optical member, wherein in a condition where the light source unit is assembled to the housing, the housing forms an opening portion that passes through the laser light emitted from the plurality of the laser light sources, and an elastic member that blocks a gap between the lens and the opening portion of the housing, the elastic member being pinched between the lens and the housing.

Further features of the present invention will become apparent from the following description of exemplary embodiments and accompanied drawings.

DESCRIPTION OF THE EMBODIMENTS

First, the exemplary embodiments proposed by the applicant of the present invention for the system including the laser light source of multiple systems, the system being such that the laser light sources are adjusted and bonded, are described with reference to FIGS. 16 to 18.

Figure 16:
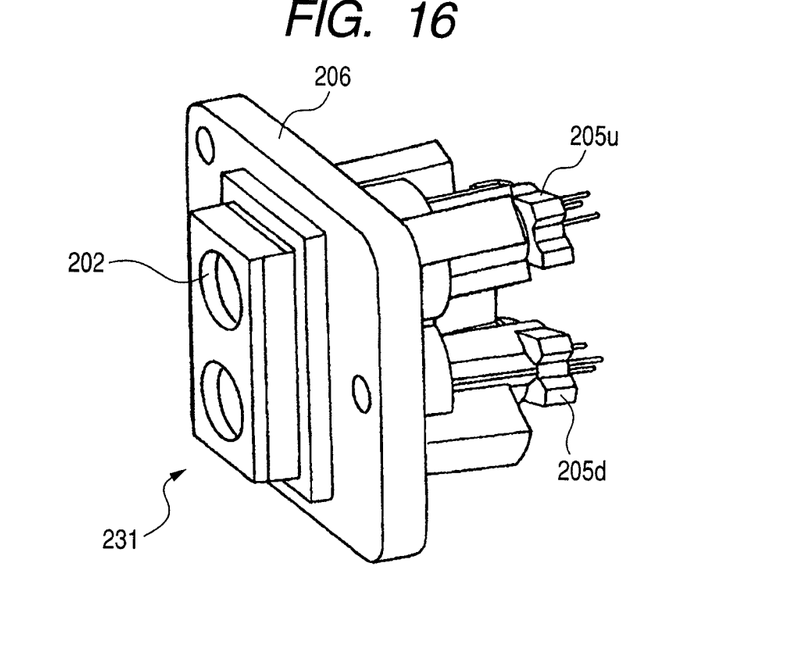
FIG. 16 is a schematic perspective view of a light source device proposed by the applicant of the present invention.
Figure 17:
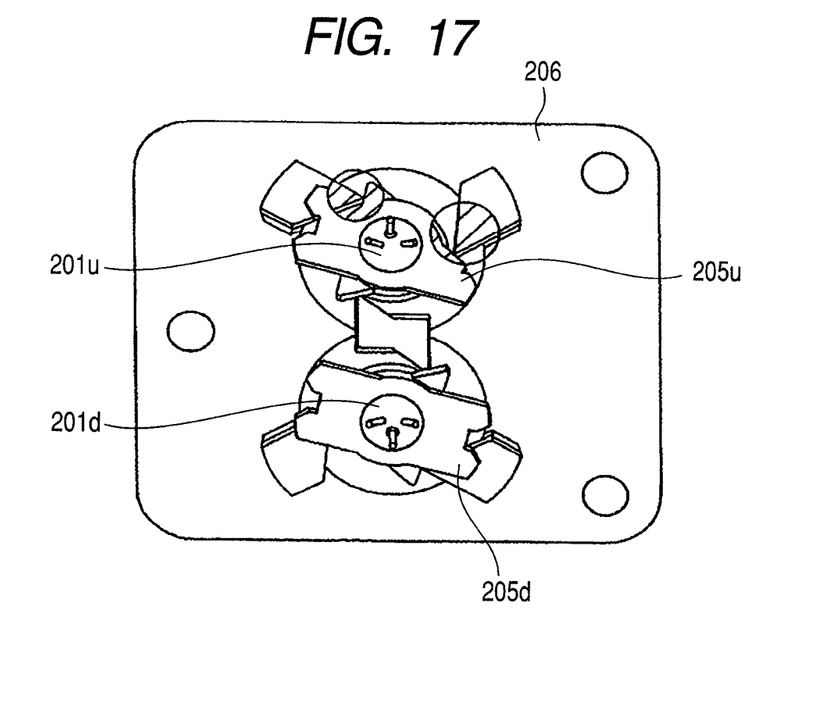
FIG. 17 is a schematic view of the light source device of FIG. 16 seen from the laser light source side.
Figure 18:
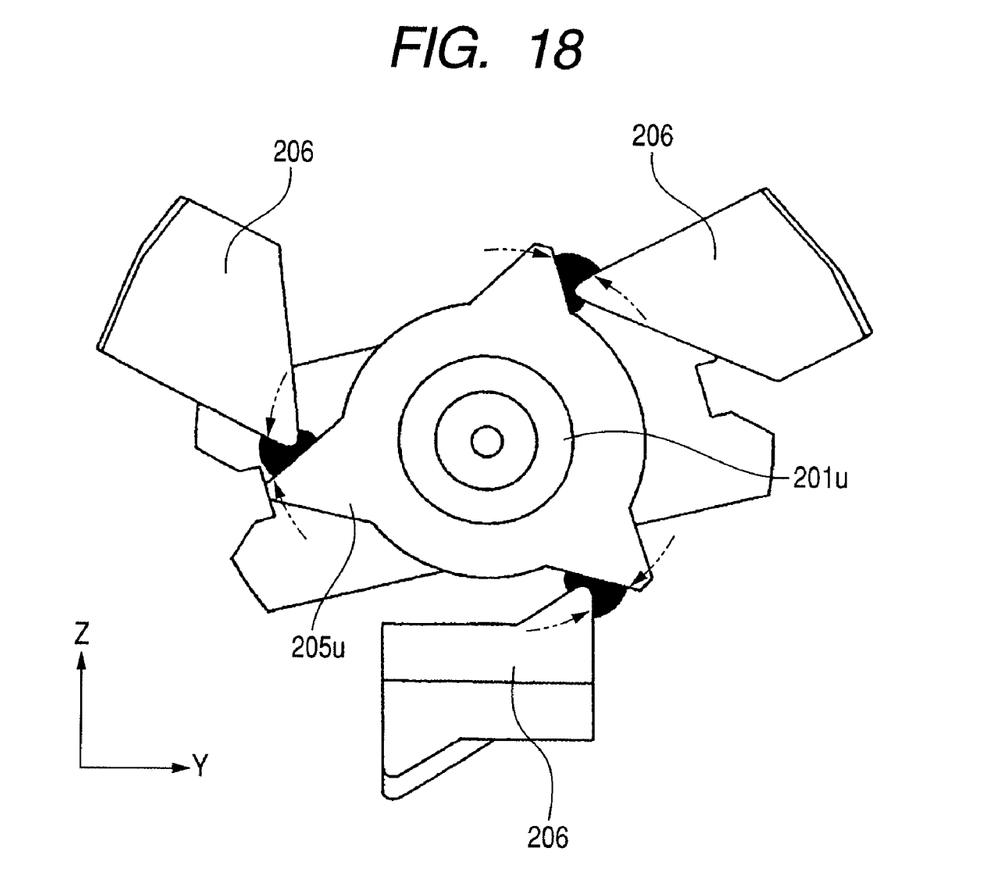
FIG. 18 is an explanatory view of a bonding region of the light source device of FIG. 16.

FIG. 16 is a schematic perspective view of a light source device 231, FIG. 17 is a schematic view of the light source device 231 seen from a laser light source side, and FIG. 18 is a view describing a bonding region of the light source device 231 and illustrates an enlarged view of the vicinity of a laser light source 201*u*.

The light source device 231 adopts a system including laser light sources 201*u*, 201*d* as two systems, where one incoming lens 202 transmits the laser light of the two systems.

Thus, as opposed to the conventional device of FIG. 14, the incoming lens 202 is first fixed to a lens support member 206 through a known technology such as bonding in the assembly of the light source device 231. The two laser light sources 201*u*, 201*d* are fixed after being individually position adjusted with respect to the incoming lens 202 by way of laser support members 205*u*, 205*d* fixed through the technology such as press-fit. The focus and optical axis of the laser light sources 201*u*, 201*d* and the incoming lens 202 are adjusted in such manner.

Note that the important characteristics here lies in the manner of applying the adhesive in the bonding of the incoming lens 202 and the bonding of the laser light sources 201*u*, 201*d*.

Stable assembly at high accuracy that does not tolerate even a slight position shift is desired on the optical components such as the incoming lens and the laser light source. Since assembly in a short period of time is desired in a tact system, ultraviolet curing type that rapidly cures with generation of heat is used for such optical components. Therefore, the adhesive is usually applied with proper balance at minimum amount only at three points at the periphery of the component as in FIG. 18.

Since the incoming lens transmits the laser light of multiple systems and thus becomes large, adverse effect may increase if the entire periphery is bonded. The bonding region of the laser light source is also a minimum of only three points at the periphery, and two gap regions without the adhesive still exist on the periphery.

In other words, in the light source device as illustrated in FIGS. 16 to 18, the flow-in path that passes through the light source device itself inevitably remains, and improvement is desired from the standpoint of dust proof performance.

The inventors contrived the present invention after thorough review to enhance the dust proof performance in the optical scanning apparatus of a system including laser light sources of multiple systems, the system being such that the laser light sources are adjusted and bonded.

An exemplary embodiment for implementing the present invention is illustratively described in detail below with reference to the drawings. The dimension, material, shape and relative arrangement of the components described in the exemplary embodiment are to be appropriately changed according to the configuration and various conditions of the apparatus to which the present invention is applied, and are not to be considered as limiting the scope of the invention by the following embodiments.

A first embodiment of the present invention is described below. An optical scanning apparatus of this embodiment is an optical scanning apparatus appropriate for a tandem-type color image forming device for forming a color image on a photosensitive member serving as an image bearing member for four colors of Y (Yellow), M (Magenta), C (Cyan), and BK (Black).

Figure 2:
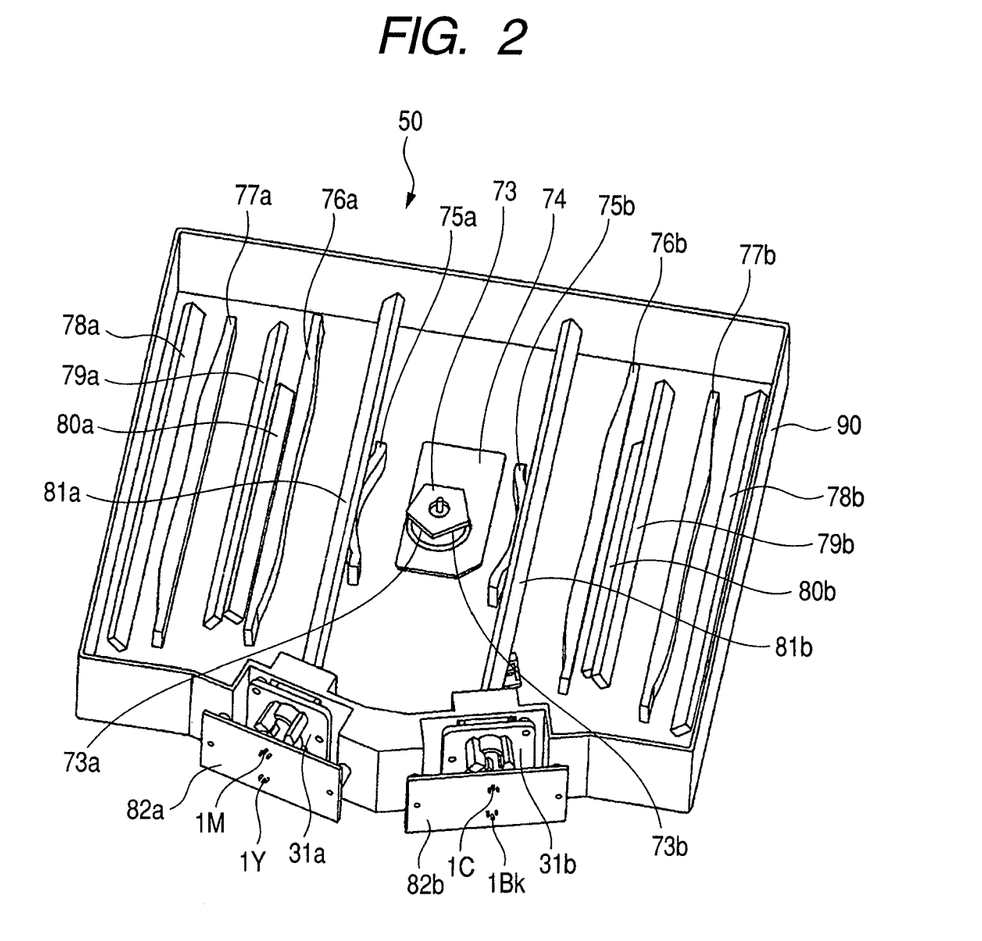
FIG. 2 is a schematic perspective view of the optical scanning apparatus of the first embodiment.

FIG. 2 is a schematic perspective view of the optical scanning apparatus of this embodiment. In the optical components illustrated in FIG. 2, if similar components are used on the left and the right with a polygon mirror 73 being interposed therebetween, the left and right are distinguished by appending a and b after the common number. In the following description, a and b are appended after the number only when left and right need to be distinguished.

The optical scanning apparatus 50 illustrated in FIG. 2 is provided with (internally includes) a polygon mirror 73, scanning lenses 75*a*, 75*b*, 76*a*, 76*b*, 77*a* and 77*b* and folding mirrors 78*a*, 78*b*, 79*a*, 79*b*, 80*a*, 80*b* 81*a* and 81*b* in one optical box (optical frame body) 90. The optical box 90 is attached with light source devices 31*a*, 31*b* serving as light source units. The light source devices 31*a*, 31*b* (hereinafter totally referred to as 31 in the specification) include semiconductor lasers 1Y, 1M, 1C, 1Bk serving as laser light sources that emit laser light modulated for each color of Y (Yellow), M (Magenta), C (Cyan), and Bk (Black). The semiconductor lasers 1Y, 1M, 1C, 1Bk are connected to circuit substrates 82*a*, 82*b*. The optical box 90 corresponds to a housing. The polygon mirror 73 corresponds to a deflect device for deflecting and scanning the laser light on the image bearing member. The scanning lenses 75*a*, 75*b*, 76*a*, 76*b*, 77*a* and 77*b* and the folding mirrors 78*a*, 78*b*, 79*a*, 79*b*, 80*a*, 80*b*, 81*a* and 81*b* correspond to the optical members for imaging the laser light on the image bearing member.

Figure 1A:
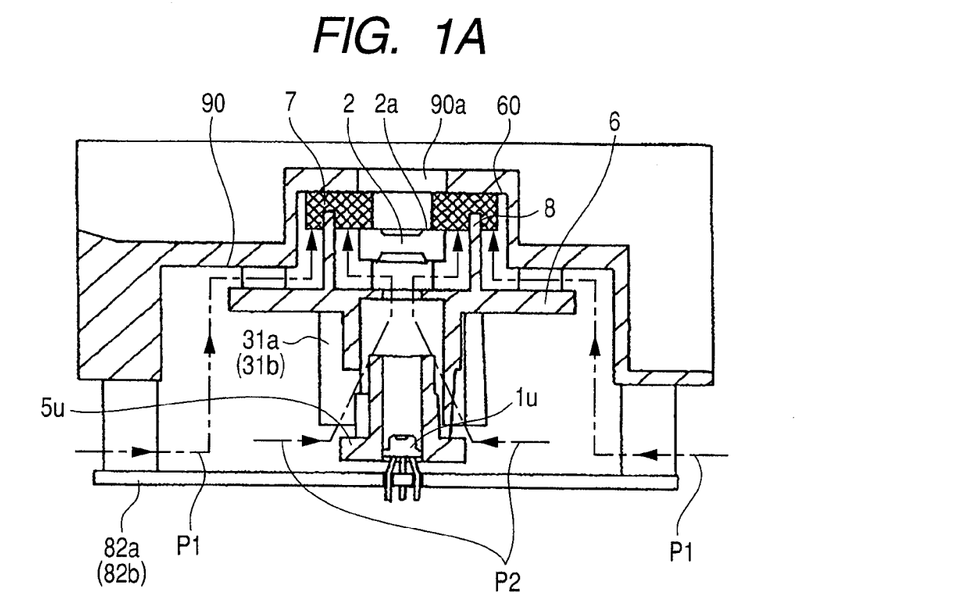
FIG. 1A is a cross-sectional view of an optical scanning apparatus of a first embodiment taken in a main scanning direction.

The semiconductor lasers 1Y, 1M, 1C, and 1Bk are arranged by twos above and below (sub-scanning direction) in each of the light source devices 31*a*, 31*b*(31), to be described later. The laser light emitted from the semiconductor lasers 1Y, 1M, 1C, 1Bk transmits through an anamorphic lens 2 (see FIG. 1) serving as a lens, and then linearly images on two different reflection surfaces 73a, 73b of the polygon mirror 73 that rotates at high speed.

The polygon mirror 73 rotates at high speed by a drive motor 74. The laser light deflected and scanned by the polygon mirror 73 is guided to and scanned on a corresponding photosensitive member (not shown) by the plural scanning lenses 75a, 75b, 76a, 76b, 77a and 77b and the folding mirrors 78a, 78b, 79a, 79b, 80a, 80b, 81a and 82b arranged symmetric to the rotation axis of the polygon mirror 73.

Figure 3:
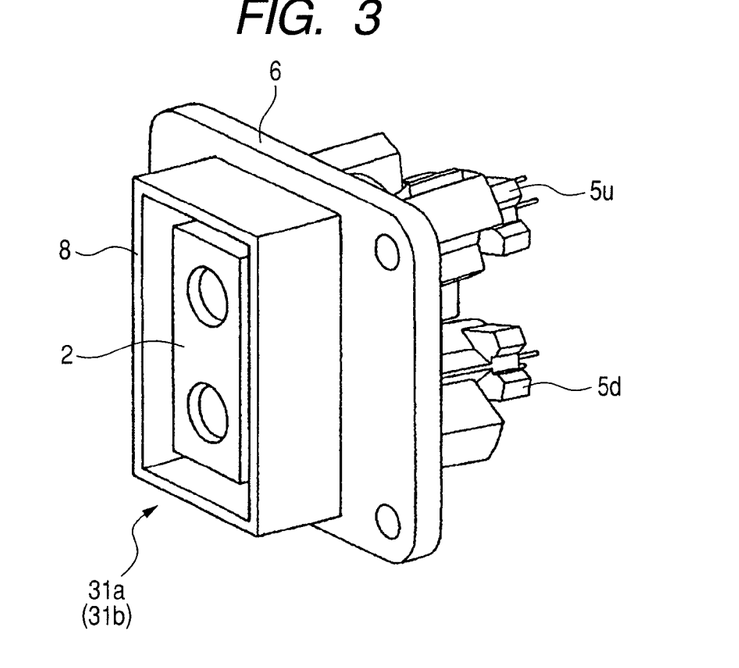
FIG. 3 is a schematic perspective view of a light source device of the first embodiment.
Figure 4:
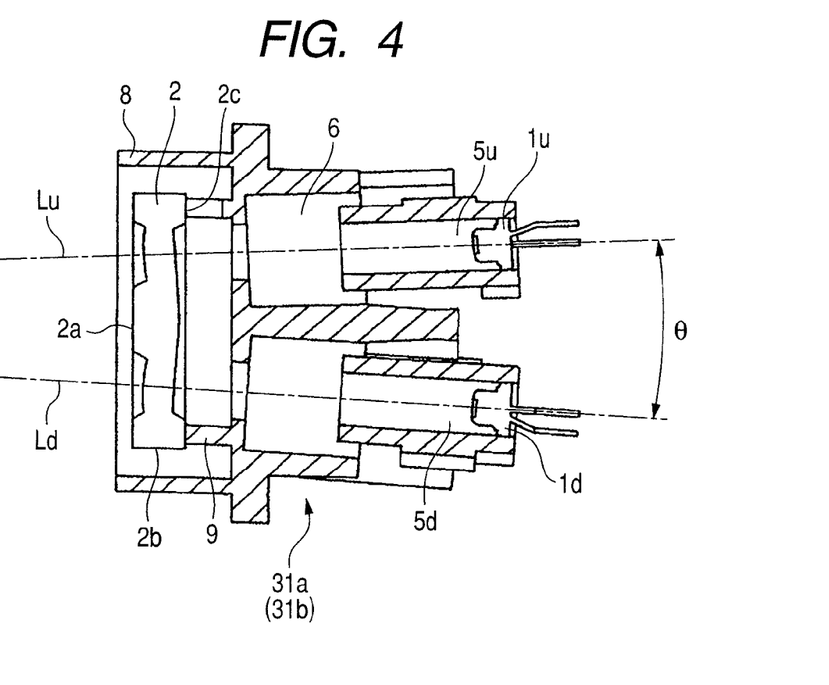
FIG. 4 is a cross-sectional view of the light source device of the first embodiment taken in a sub-scanning direction.

FIG. 3 is a schematic perspective view illustrating the light source device 31 and FIG. 4 is a schematic cross-sectional view in the sub-scanning direction illustrating the light source device 31.

As illustrated in the drawings, the light source device 31 includes laser light sources 1u (correspond to one of semiconductor laser 1M and semiconductor laser 1Bk), id (correspond to one of semiconductor laser 1Y and semiconductor laser 1C), and the compound anamorphic lens 2, which is the imaging lens. The anamorphic lens 2 has a lens unit having different power in the main scanning direction and the sub-scanning direction arranged at two locations above and below in correspondence to the two laser light sources. In other words, one anamorphic lens 2 is arranged with respect to the plurality of the laser light sources.

The main scanning direction is the direction parallel to the direction of scanning the laser light deflected by the polygon mirror 73 on the photosensitive member, and the sub-scanning direction is the direction parallel to the rotation axis of the polygon mirror 73. In this embodiment, for the sake of convenience of the explanation, the vertical direction is the vertical direction when the bottom surface of the optical box 90 in which the polygon mirror 73 and the optical components are arranged as illustrated in FIG. 2 is horizontal, and the vertical direction in this case is the sub-scanning direction.

In this embodiment, the anamorphic lens 2 is arranged for the lens, but this is not the sole case. That is, the lens is not limited to the anamorphic lens as long as a function of aligning the shape of the laser beam is provided for the incoming lens. It suffices that the lens can obtain effects same as when the anamorphic lens 2 is applied merely.

The laser light sources 1u, 1d are fixed to the laser support members 5u, 5d through an existing technology such as press-fit. The anamorphic lens 2 is fixed to a bonding portion 9 of the lens support member 6 through an existing technology such as bonding. The laser support members 5u, 5d are position adjusted at high accuracy with respect to the anamorphic lens 2, and then bonded and fixed to the lens support member 6 with light curing adhesive (not shown). The lens support member 6 is arranged at the periphery of the anamorphic lens 2, and includes a protruding portion 8 projecting to the downstream side in the laser light emitting direction (downstream side in the optical path of the laser light) with respect to the lens emitting surface 2a or the surface on the laser light emitting side of the anamorphic lens 2.

According to such configuration, the laser light fluxes Lu, Ld are emitted in the light source device 31 as illustrated in FIG. 4. The laser light fluxes Lu, Ld, which are divergent light emitted from the laser light sources 1u, 1d, pass through the anamorphic lens 2, and are converted to parallel light in the main scanning direction and converted to converged light in the sub-scanning direction. The laser light flux Lu emitted from the laser light source 1u and the laser light flux Ld emitted from the laser light source id are arranged so as to form a predetermined angle θ with respect to each other after transmitting through the anamorphic lens 2. Thus, the laser light fluxes enter their positions proximate to each other on the reflection surface of the polygon mirror 73 illustrated in FIG. 2.

Figure 5:
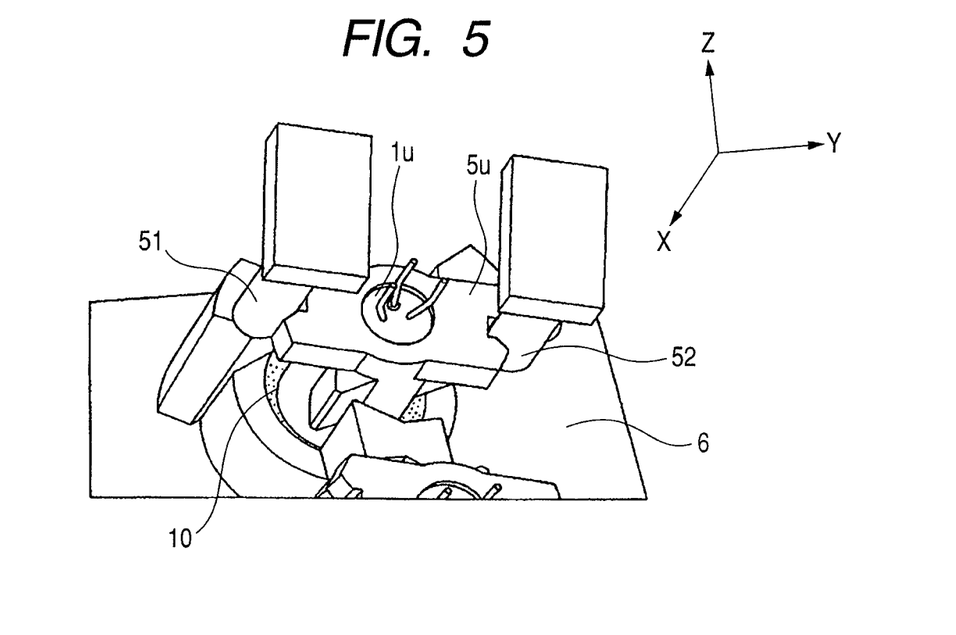
FIG. 5 is a view illustrating an assembly adjustment method for the light source device of the first embodiment.

FIG. 5 is an enlarged view of the vicinity of the laser light source in the position adjustment of the laser support member 5u using a jig, and illustrates the assembly adjustment method for the light source device of this embodiment. As illustrated in FIG. 5, the laser support member 5u into which the laser light sources 1u is fixed is gripped by chucks 51, 52.

As illustrated in FIG. 5, the laser support member 5u is clamped with the chucks 51, 52 and position adjusted in three directions of X, Y, Z. Thus, an adjustment clearance as illustrated with a hatched portion 10 is necessary between the laser support member 5u and the lens support member 6 such that the laser support member 5u does not interfere with the lens support member 6 even if moved in position adjustment.

As described above, in order to bond and fix at high accuracy in a short period of time, a minimum amount of adhesive is suitably applied to the balanced region, and thus the adjustment clearance remains as it is and the flow-in path that passes through the light source device remains as illustrated in FIG. 4.

The dust proof mode, which is a characteristic of this embodiment, is described with reference to FIGS. 1 and 6. The characteristic of this embodiment lies in inexpensively and easily preventing the flow-in of dust from the vicinity of the laser light source without degrading the optical performance.

Figure 1B:
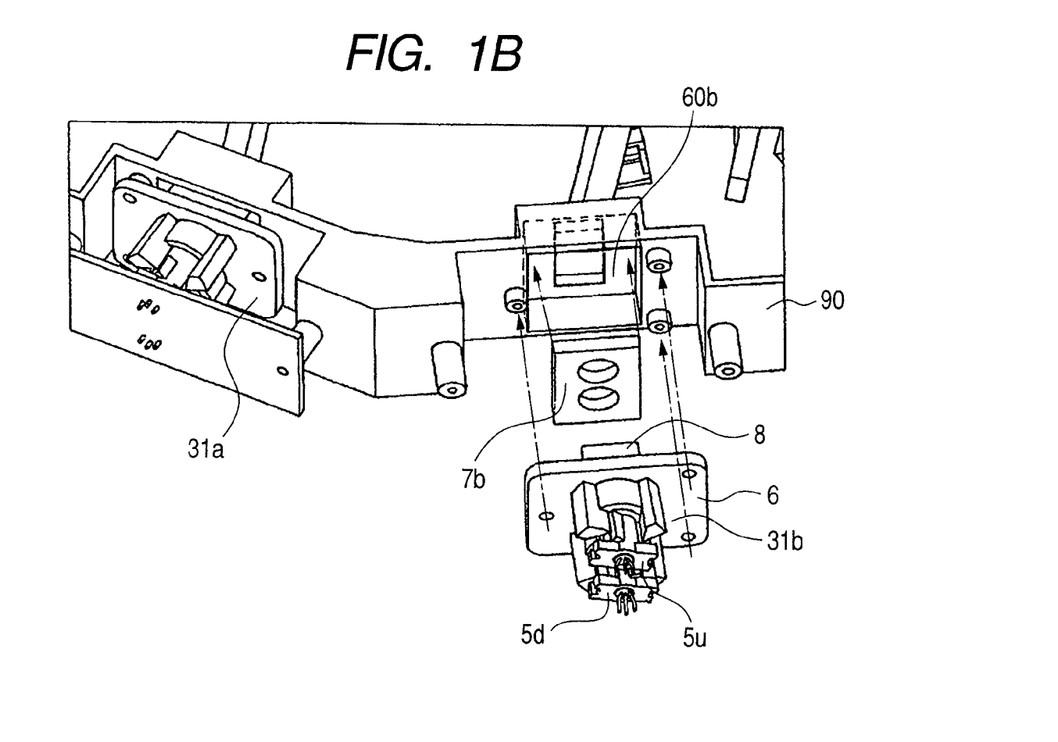
FIG. 1B is a schematic perspective view of the optical scanning apparatus of the first embodiment seen from a rear surface side of a laser light source.

FIG. 1A is a schematic cross-sectional view of the optical scanning apparatus of this embodiment taken in the main scanning direction, and FIG. 1B is a schematic perspective view of the optical scanning apparatus of this embodiment seen from the rear surface side of the laser light source (upstream side in laser light emitting direction). FIG. 6 is a schematic cross-sectional view taken in the main scanning direction illustrating the flow-in path of dust to the optical box 90 when a dust proof seal 7 serving as an elastic member used in this embodiment is not present.

Figure 6:
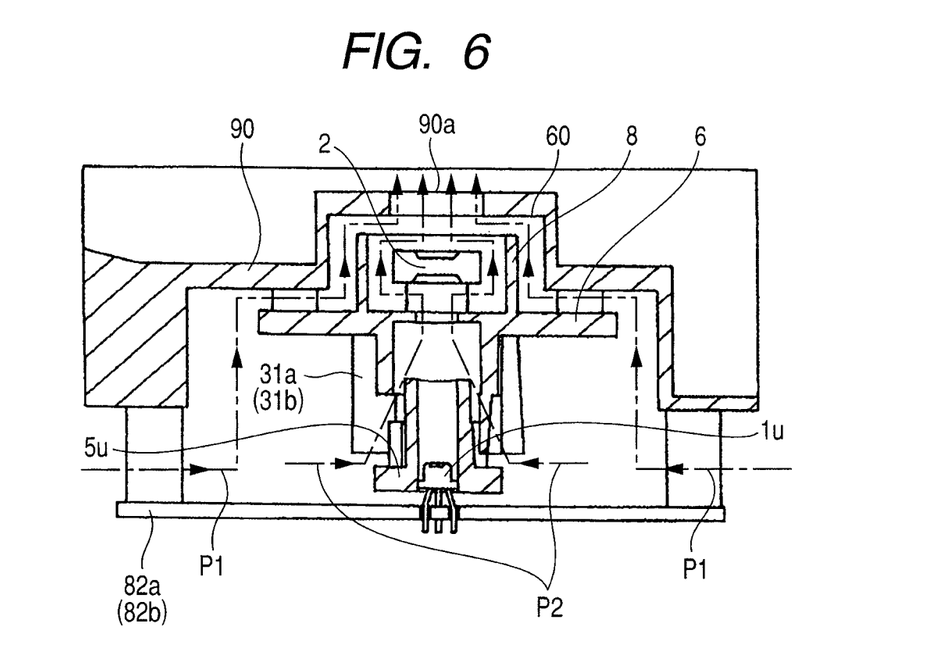
FIG. 6 is a schematic cross-sectional view illustrating a flow-in path of dust to an optical box when a dust proof seal is not present in the first embodiment.

As illustrated in FIG. 6, when the dust proof seal 7 is not used, the flow-in path of dust from the vicinity of the light source device 31 to the optical box 90 includes a path P1 from the gap between the light source device 31 and the optical box 90, and a path P2 passing through the light source device 31. If any one of the paths is present, such path acts as the flow-in path of the dust, whereby the dust flows into the optical box 90 from an opening portion 90a formed in the optical box 90 to pass the laser light, and the optical performance may degrade.

In order to prevent degradation of the optical performance caused by dust, the dust from the two flow-in paths needs to be shielded. As described in Japanese Patent Application Laid-Open No. H11-242176, a method of shielding the gap of the light source device 31 and the optical box 90 by the elastic member is effective.

A method of contacting the anamorphic lens 2 and the lens support member 6 over the entire surface and shielding the flow-in path is also considered to prevent the dust from flowing-in from the path that passes through the light source device 31. However, a very high position accuracy is demanded on the anamorphic lens 2, and it is difficult to guarantee high accuracy over the entire contacting surface with respect to the lens support member 6 generally made through resin molding. A method of bonding with the lens support member 6 over the entire emitting surface of the anamorphic lens 2 and shielding the flow-in path is also considered, but is not suitable because the fluctuation due to variation in curing of the adhesive and fluctuation due to expansion and contraction of adhesive under various environments have a high possibility of occurring.

In this embodiment, the dust proof seal 7 serving as the elastic member is used for the method of shielding the flow-in path from the path that passes through the light source device 31.

The elastic member is made of material such as rubber form or polyurethane foam, and excels in sealability of the gap because it has low hardness and easily follows the shape of the counterpart, where the reaction force when squashed is minor because the elastic member deforms with low load. Thus, the elastic member is suited for providing at the periphery of the anamorphic lens 2 where high position accuracy is demanded, as described above.

As illustrated in FIG. 1B, the dust proof seal 7 serving as the elastic member is squashed to the desired thickness by being sandwiched between the optical box 90 and anomorphic lens 2 in each of the light source devices 31a, 31b. In assembling, assembly is realized with satisfactory workability by adopting the method of fitting the dust proof seal 7 into the optical box 90, and thereafter assembling the light source device 31.

The dust proof seal 7 is arranged to contact the surface (lens emitting surface) 2a on the laser light emitting side of the anamorphic lens 2 and the reception surface 60 of the optical box 90 faced thereto so as to be sandwiched between the optical box 90 and the light source device 31. The reception surface 60 corresponds to a first opposing surface.

According to such configuration, as illustrated in FIG. 1A which is the cross-sectional view in the main scanning direction of the optical scanning apparatus, both the path P1 from the gap between the light source device 31 and the optical box 90 and the path P2 that passes through the light source device can be shielded with one elastic member (dust proof seal 7). Therefore, the gap between the anamorphic lens 2 and the opening portion 90a of the optical box 90 can be blocked, and the dust is prevented from flowing-in from the vicinity of the laser light source to the interior of the optical box 90.

The protruding portion 8 of the lens support member 6 projects out with respect to the lens emitting surface 2a of the anamorphic lens 2, and thus the dust proof seal 7 is pinched between the lens emitting surface 2a and the reception surface 60 and pinched between the protruding portion 8 and the reception surface 60. Thus, if the protruding portion 8 of the lens support member 6 projects out with, respect to the lens emitting surface 2a of the anamorphic lens 2, the dust proof seal 7 is squashed more between the protruding portion 8 and the reception surface 60 than between the anamorphic lens 2 and the reception surface 60.

Therefore, the reaction force received by squashing the dust proof seal 7 applies more on the lens support member 6 including the protruding portion 8 than on the anamorphic lens 2. The reaction force generated by contacting the dust proof seal 7 to the reception surface 60 thus can be received by the protruding portion 8, and the reaction force on the anamorphic lens 2 can be suppressed to a minimum. In other words, the anamorphic lens 2 is less susceptible to the reaction force generated by contacting the dust proof seal 7 to the reception surface 60 in this embodiment. As described above, the load on the anamorphic lens 2 needs to be suppressed as much as possible because very high position accuracy is demanded on the anamorphic lens 2.

According to such configuration, the dust is prevented from flowing-in from the vicinity of the laser light source at lower cost without affecting the optical performance.

According to this embodiment, therefore, the dust proof seal 7 is provided so as to be sandwiched between the anamorphic lens 2 and the optical box 90 in the system including the laser light sources of two systems, the system being set such that the laser light sources are adjusted and bonded. Thus, the gap passing through the light source device can be blocked while blocking the gap between the light source device 31 and the optical box 90, and in addition, the dust can be prevented with one elastic member.

Thus, the dust proof performance equal to or higher than that in the system including the laser light source of one system or that in the system in which the laser is press fit of the related art can be inexpensively and easily achieved in the system including the laser light sources of two systems, the system being set such that the laser light sources are adjusted and bonded. Thus, the image quality degradation arising from the stain by the dust can be more effectively prevented particularly in the optical scanning apparatus for the color image forming device.

Figure 7:
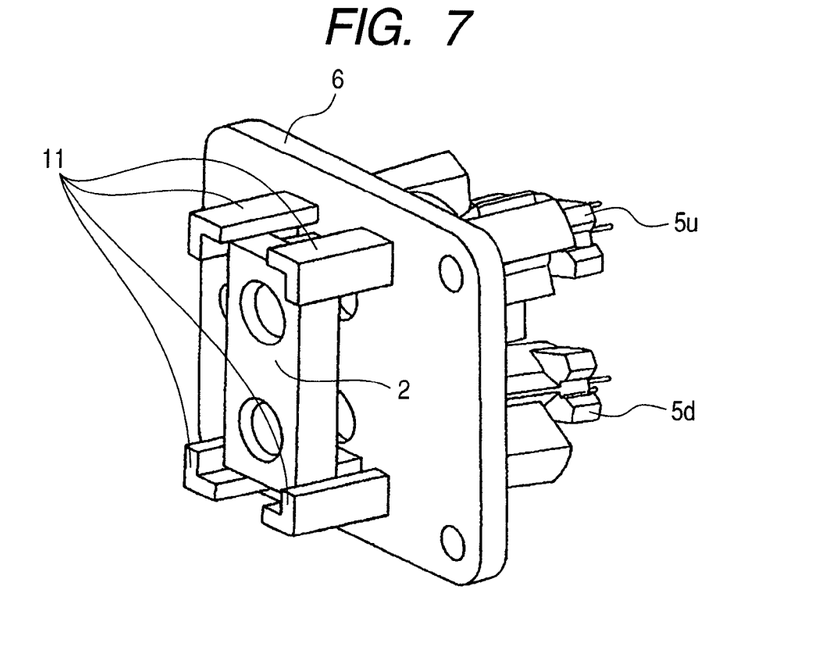
FIG. 7 is a schematic view illustrating another mode of the first embodiment.

In this embodiment, while the protruding portion 8 is provided over the entire periphery of the anamorphic lens 2, this should not be construed restrictively. The reaction force generated by squashing the dust proof seal 7 merely needs to be received by the protruding portion than by the anamorphic lens 2, and thus the protruding portion does not need to be provided over the entire periphery of the anamorphic lens 2. For instance, plural protruding portions projecting out with respect to the emitting surface side of the anamorphic lens 2 may be provided at the periphery of the anamorphic lens 2, and plural protruding portions 11 projecting out with respect to the emitting surface side of the anamorphic lens 2 may be configured as illustrated in FIG. 7.

A second embodiment of the present invention is described below.

In this embodiment, other types of the dust proof seal 7, the lens support member 6, the optical box 90, the opening portion 90a, the reception surface 60, and the light source device 31 of the first embodiment are illustrated. Description is made below using a dust proof seal 17, a lens support member 16, an optical box 91, an opening portion 91a, a reception surface 61, and a light source device 32. In this embodiment, the configuring portions different from those in the first embodiment are described, and the description on the configuring portions similar to the first embodiment is omitted.

Figure 8:
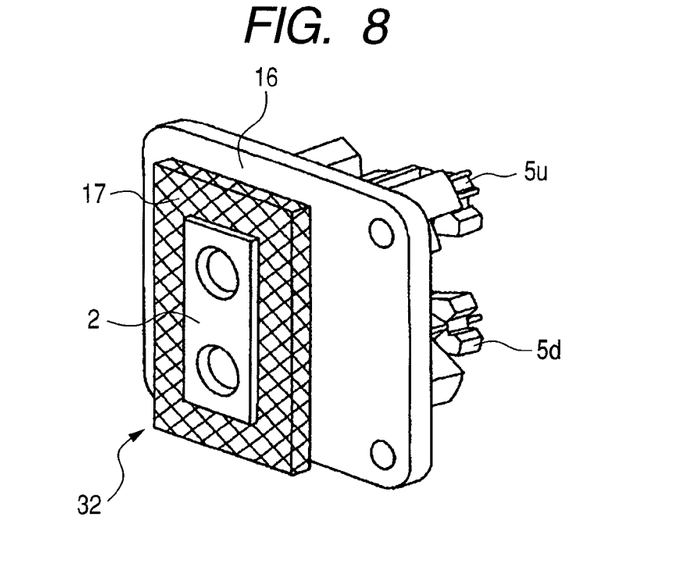
FIG. 8 is a schematic perspective view of a light source device of a second embodiment.
Figure 9:
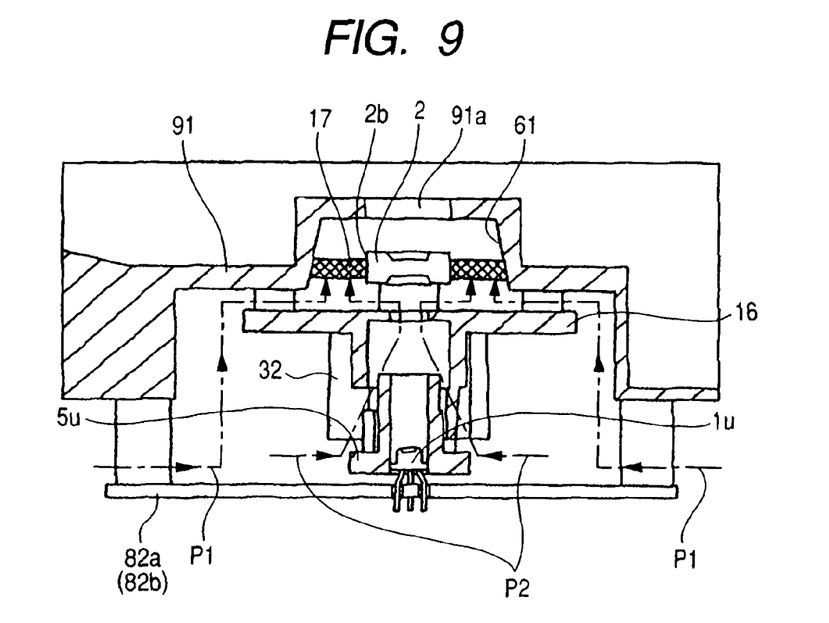
FIG. 9 is a cross-sectional view of an optical scanning apparatus of the second embodiment taken in a main scanning direction.

FIG. 8 is a schematic perspective view of the light source device 32 of this embodiment, and FIG. 9 is a schematic cross-sectional view in the main scanning direction of the optical scanning apparatus.

In this embodiment, the dust proof seal 17 is pinched (contacted) by the entire periphery (entire surface perpendicular to lens emitting surface 2a) of the lens side surface 2b, which is a surface parallel to the laser light emitting direction in the anamorphic lens 2, and the reception surface 61 of the optical box 91 faced thereto. Thus, the two flow-in paths P1, P2 are shielded as illustrated in FIG. 9. The reception surface 61 corresponds to a second opposing surface.

The concern that arises in this case is that the dust proof seal 17 may twist in assembling and may not be securely contacted with the reception surface 61, thereby forming the flow-in path of the dust. Thus, in this configuration, the reception surface 61 on the optical box 91 side has a tapered shape that gradually narrows towards the emitting direction of the laser beam.

The reception surface 61 merely needs to have a configuration in which the width in at least one direction of the directions orthogonal to the laser light emitting direction gradually narrows towards the downstream side in the laser light emitting direction. A case where the cross-sectional shape of the inner wall of the reception surface 61 is formed to a substantially square shape so as to correspond to the dust proof seal 17 having an outer shape of a substantially square shape illustrated in FIG. 8 is as described below. The width between at least one of the pairs of inner walls of the two pairs of opposing inner walls configuring the square cross-section merely needs to gradually narrow towards the downstream side in the laser light emitting direction.

According to such configuration, in assembling, the dust proof seal 17 is first fitted to the light source device 32 as illustrated in FIG. 8, and then the light source device 32 is assembled to the optical box 91. The dust proof seal 17 thus changes shape in conformity with the tapered shape of the reception surface 61, whereby irregular deformation such as twisting is less likely to occur.

The direction the reaction force generated by squashing the dust proof seal 17 acts is the main scanning direction and the sub-scanning direction. The position accuracy in the main scanning direction and the sub-scanning direction demanded on the anamorphic lens 2 is low in comparison with the optical axis direction, and thus the degradation in the optical performance caused by squashing the dust proof seal 17 can be avoided.

Figure 10:
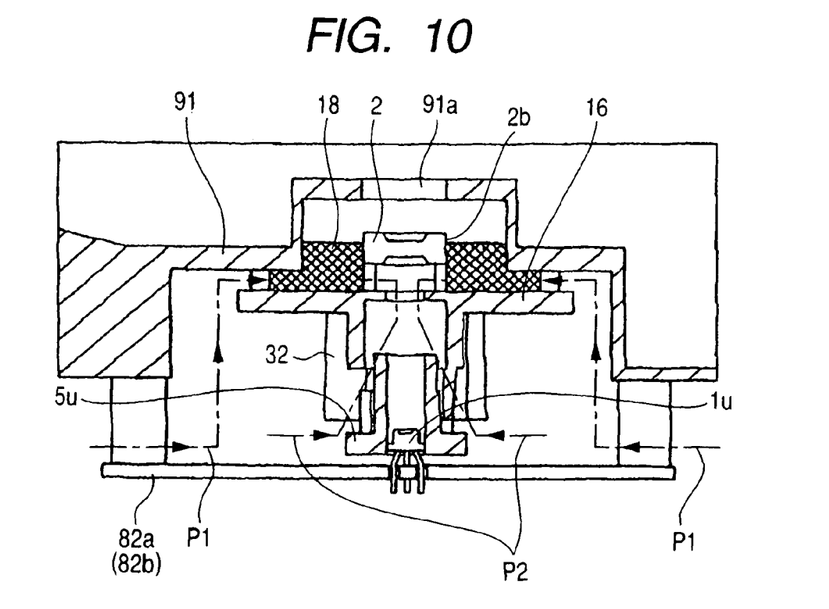
FIG. 10 is a schematic view illustrating another mode of the second embodiment.

In this embodiment, while the dust proof seal 17 and the optical box 91 are contacted in the main scanning direction and the sub-scanning direction, this should not be construed restrictively. In another mode, as illustrated in FIG. 10, even if a dust proof seal 18 is configured to contact the optical box 91 in the optical axis direction, the dust proof seal 18 can be contacted in the main scanning direction and the sub-scanning direction with respect to the optical box 91 due to its elasticity, and effects similar to the above can be obtained.

The third embodiment of the present invention is described below.

In this embodiment, other types of the dust proof seal 17, the lens support member 16, and the light source device 32 of the second embodiment are illustrated. Description is made below using a dust proof seal 27, a lens support member 26, and a light source device 33. In this embodiment, the configuring portions different from those of the first and second embodiments are described, and the description on the configuring portions similar to the first and second embodiments is omitted.

Figure 11:
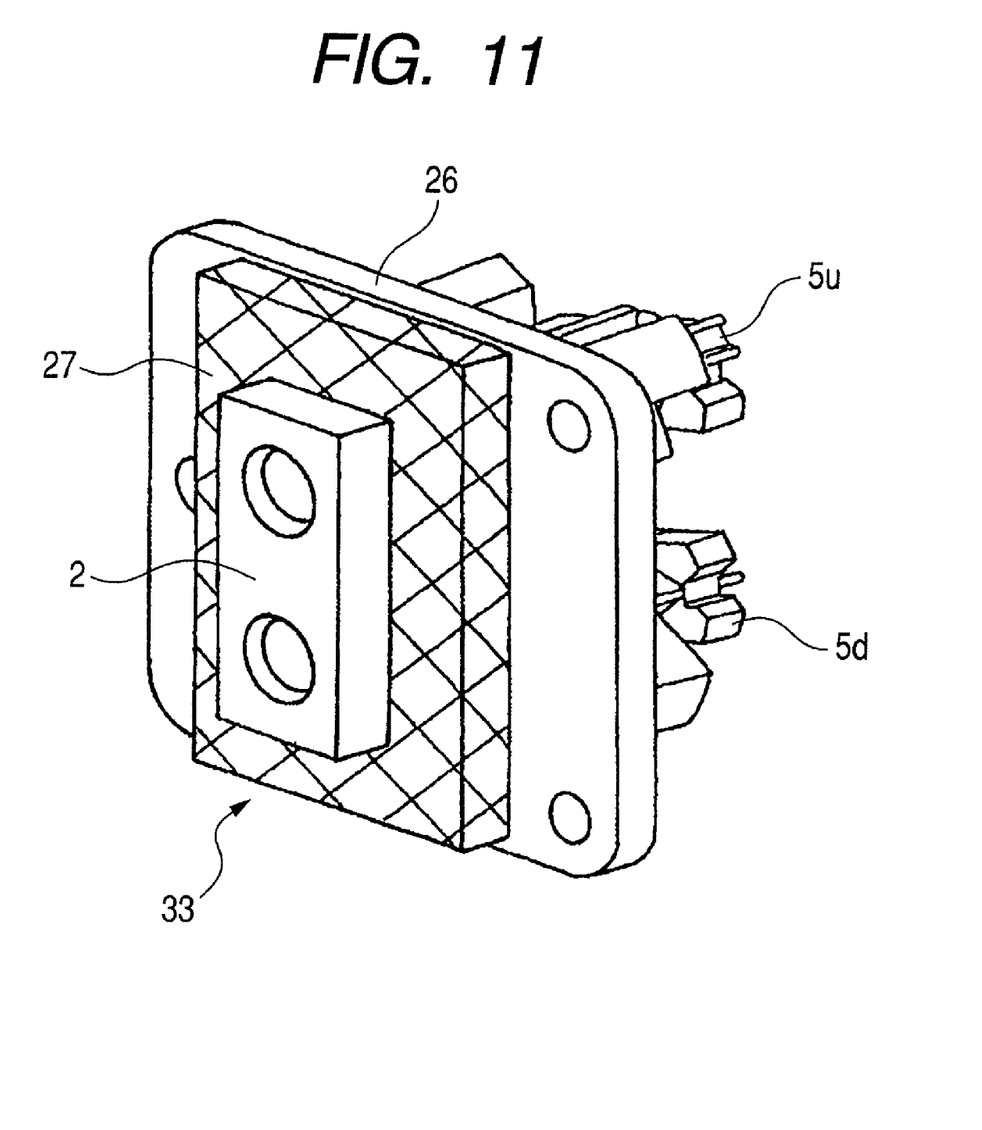
FIG. 11 is a schematic perspective view of a light source device of a third embodiment.
Figure 12:
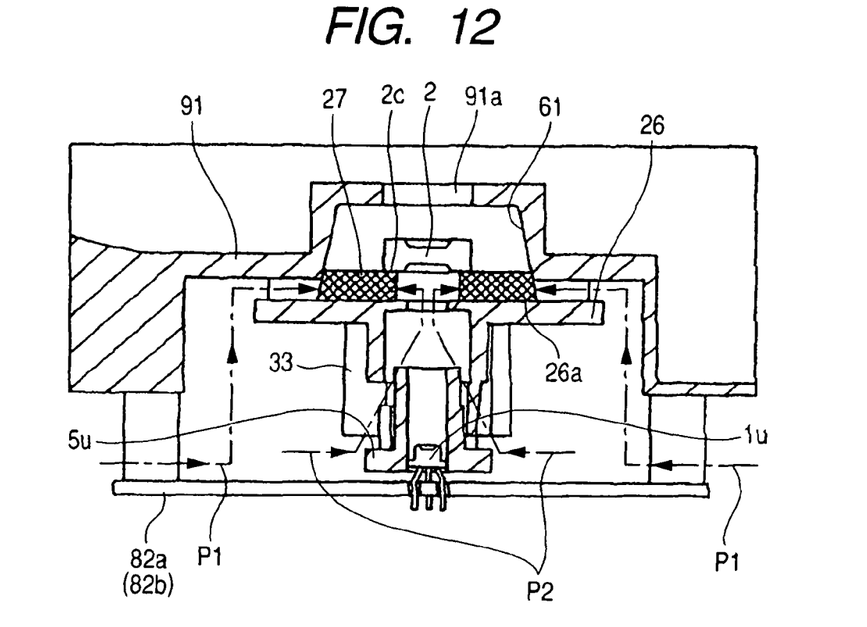
FIG. 12 is a cross-sectional view of an optical scanning apparatus of the third embodiment taken in a main scanning direction.

FIG. 11 is a schematic perspective view of the light source device 33 of this embodiment, and FIG. 12 is a schematic cross-sectional view in the main scanning direction of the optical scanning apparatus.

In this embodiment, the dust proof seal 27 is pinched (contacted) by a lens incoming surface 2c, which is the surface on the laser light incoming side of the anamorphic lens 2, an opposing surface 26a of a lens support member 26 facing the lens incoming surface 2c, and the reception surface 61 of the optical box 91 orthogonal to the lens incoming surface 2c. Thus, two flow-in paths P1, P2 are shielded as in FIG. 12. The reception surface 61 is a surface parallel to the laser light emitting direction, and corresponds to a fourth opposing surface of the optical box 91 provided so as to face the entire periphery of the lens side surface 2b, which is the surface parallel to the laser light emitting direction in the anamorphic lens 2. The opposing surface 26a corresponds to the third opposing surface.

As in the case of the second embodiment, the concern that arises in this case is that the dust proof seal 27 may twist in assembling and may not be securely contacted with the optical box 91, thereby forming the flow-in path of the dust. Thus, in this configuration, as in the case of the second embodiment, the reception surface 61 on the optical box 91 side has a tapered shape that gradually narrows towards the emitting direction of the laser light.

In assembling, the anamorphic lens 2 is bonded with the dust proof seal 27 sandwiched between the anamorphic lens 2 and the lens support member 26, and the laser support member 5 is adjusted in such state to prepare the light source device 33.

In the first and second embodiments, the reaction force generated by squashing the dust proof seal is received in a state of the light source device, in which the position adjustment of the anamorphic lens and the laser light source is completed.

In this configuration, on the other hand, the laser light sources 1u, 1d are adjusted and the light source device 33 is formed with the anamorphic lens 2 already receiving the reaction force generated by squashing the dust proof seal 27.

Thus, if after the light source device 33 is formed, the load newly applies on the anamorphic lens 2 does not exist, and thus the degradation of the optical performance can be prevented.

Figure 13:
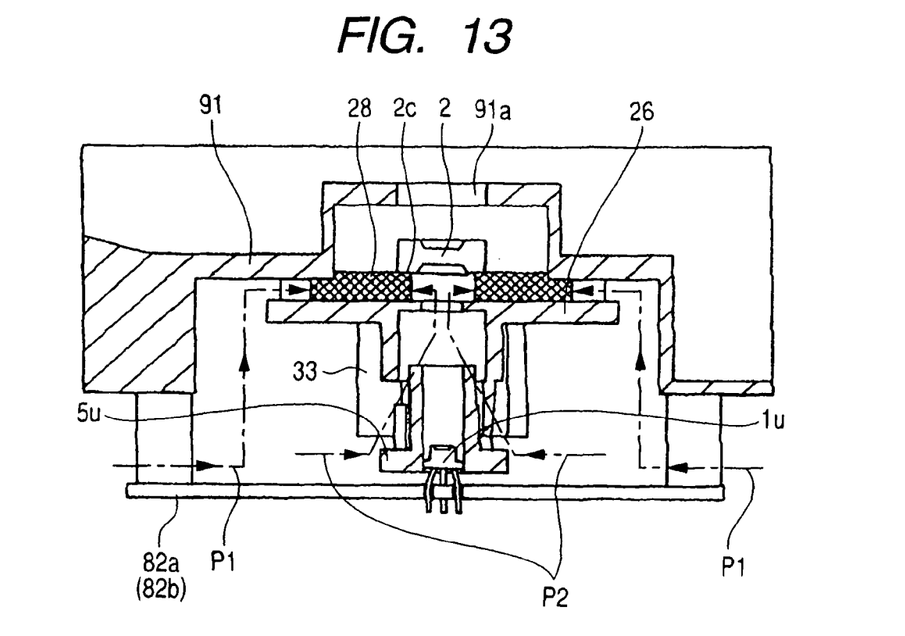
FIG. 13 is a schematic view illustrating another mode of the third embodiment.

In this embodiment, while the dust proof seal 27 and the optical box 91 are contacted in the main scanning direction and the sub-scanning direction, this should not be construed restrictively. In another mode, as illustrated in FIG. 13, even if a dust proof seal 28 is configured to contact the optical box 91 in the optical axis direction, the dust proof seal 28 can be contacted in the main scanning direction and the sub-scanning direction with respect to the optical box 91 due to its elasticity, and effects similar to the above can be obtained.

Therefore, according to the present invention, the flow-in path that passes through the light source unit itself can be sealed and the gap between the light source unit and the housing can also be sealed with a simple configuration in the configuration using the compound incoming lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-205634, filed Aug. 8, 2008, which is hereby incorporated by reference herein in its entirety.

What is claimed is:

1. An optical scanning apparatus comprising:
   a light source that emits a laser light;
   a lens unit including a lens through which the laser light emitted from the light source is passed, and a support member supporting the lens, wherein a first gap is formed between the support member and the lens in a condition where the support member supports the lens;
   a deflect device that deflects and scans the laser light on an image bearing member;
   a housing that internally includes the deflect device, wherein in a condition where the lens unit is assembled to the housing, the housing includes an opening portion through which the laser light emitted from the light source passes, wherein a second gap is formed between the support member and the housing in a condition where the lens unit is supported by the housing; and
   a single elastic member pinched between the lens and the housing, wherein the single elastic member blocks the second gap between the support member and the housing and the first gap between the support member and the lens.

2. An optical scanning apparatus according to claim 1, wherein the elastic member is provided between the lens and the housing in a direction in which the laser light is emitted.

3. An optical scanning apparatus according to claim 2, wherein support member comprises a protruding portion that projects out to a downstream side of the lens in a laser light emitting direction; and the elastic member is further pinched between the protruding portion and the housing.

4. An optical scanning apparatus according to claim 1, wherein the lens includes a side surface parallel to the laser light emitting direction and the housing includes a first surface which faces to a whole periphery of the side surface of the lens, and the elastic member is further pinched between the side surface and the first surface.

5. An optical scanning apparatus according to claim 4, wherein a side of the housing opposing the first surface is configured to have a width in at least one direction of directions orthogonal to the laser light emitting direction gradually narrows towards a downstream side in the laser light emitting direction.

6. An optical scanning apparatus according to claim 1, wherein the lens includes an incoming surface into which the laser light comes, the support member includes a second surface that faces to the incoming surface, the housing includes a third surface that faces a whole periphery of a side surface parallel to the lens in the laser light emitting direction, and the elastic member is further pinched between the incoming surface of the lens and the second surface and the third surface.

7. An optical scanning apparatus according to claim 6, wherein the third surface is configured to have a width in at least one direction of directions orthogonal to the laser light emitting direction gradually narrows towards a downstream side in the laser light emitting direction.

8. An optical scanning apparatus according to claim 1, further comprising a second support member that supports the light source,
    wherein a third gap is formed between the support member and the second support member in a condition where the support member supports the second support member.

9. An optical scanning apparatus according to claim 8, further comprising a second light source that emits laser light and a third support member that supports the second light source,
    wherein the support member supports the second support member and the third support member, and the laser lights emitted from the light source and the second light source pass through the lens.

\* \* \* \* \*